Oct. 22, 1968  A. J. FURSTENBURG ET AL  3,406,430
MOLD FOR MOLDING STRIPS

Filed April 13, 1966  4 Sheets-Sheet 1

INVENTORS
Alvin J. Furstenburg
Edmund J. Kujawa
by Dressler, Goldsmith, Clement
and Gordon
Attys

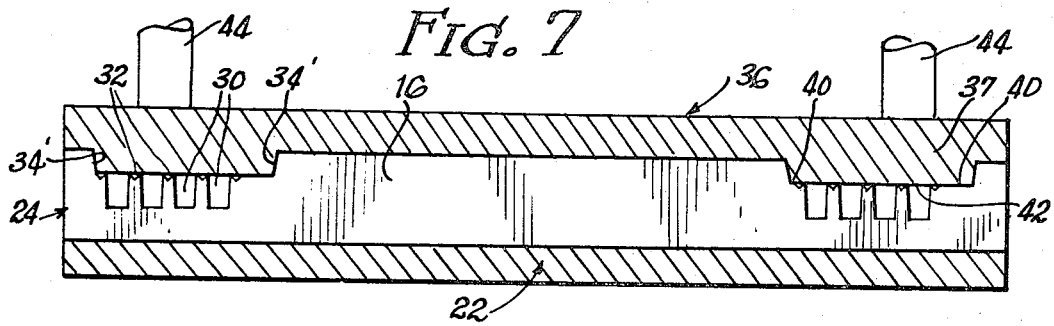
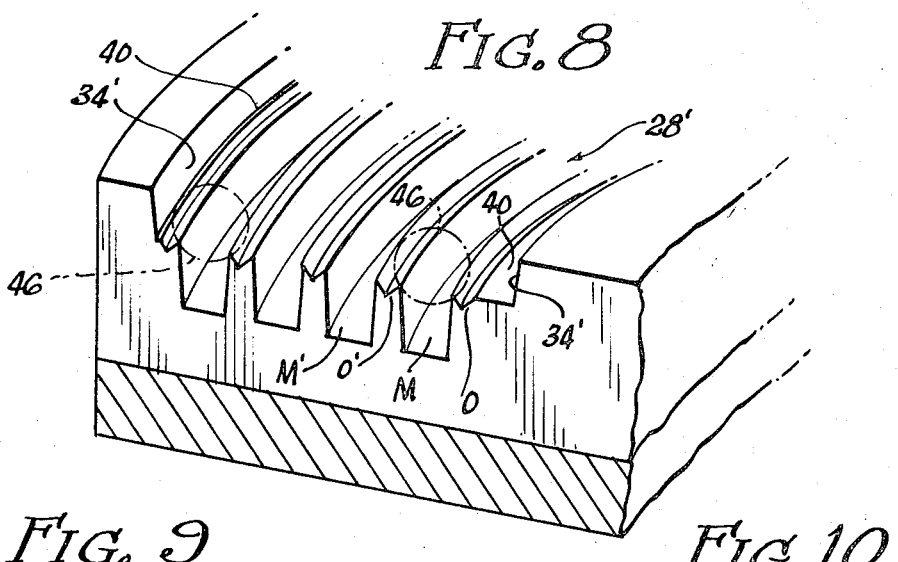
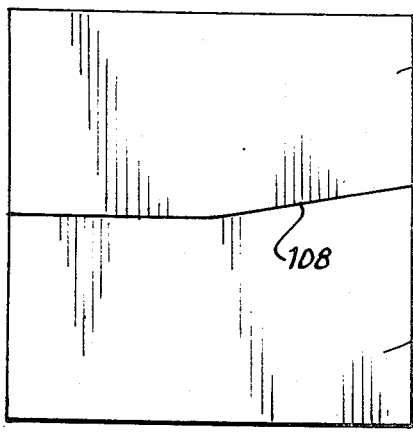
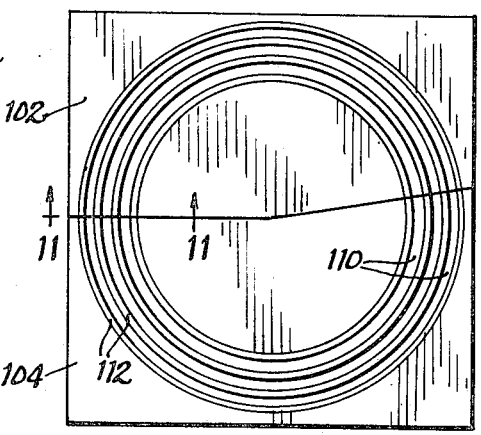
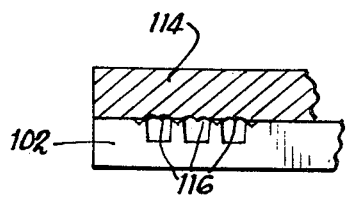

Oct. 22, 1968  A. J. FURSTENBURG ET AL  3,406,430
MOLD FOR MOLDING STRIPS
Filed April 13, 1966  4 Sheets-Sheet 3

INVENTORS
Alvin J. Furstenburg
Edmund J. Kujawa
by Dressler, Goldsmith, Clement
and Gordon
Att'ys

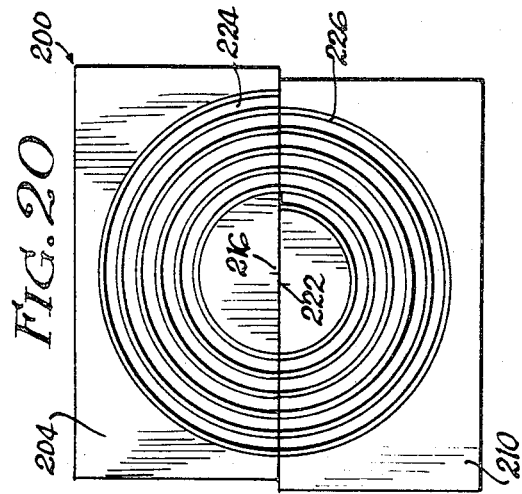
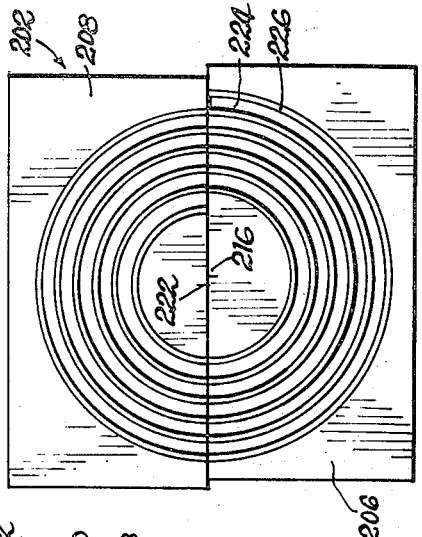
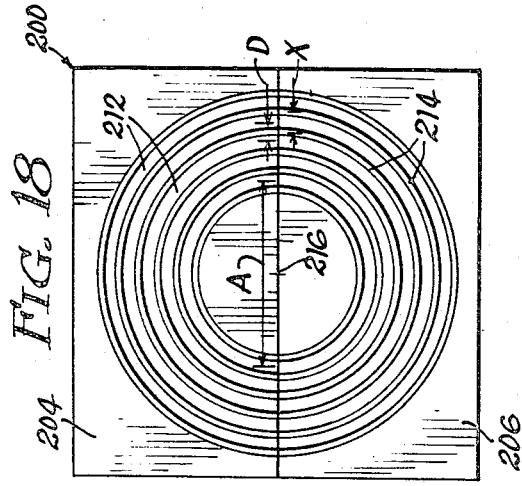
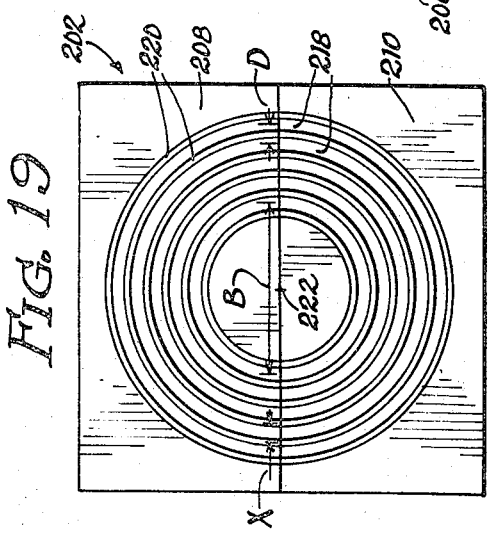
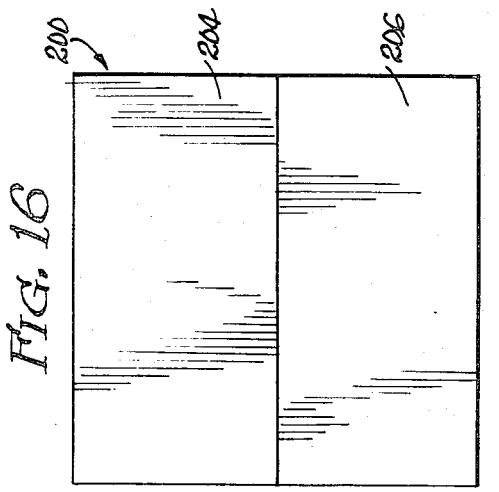
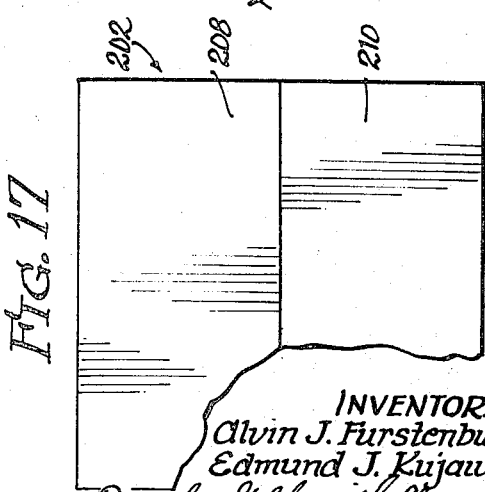

United States Patent Office 3,406,430
Patented Oct. 22, 1968

3,406,430
MOLD FOR MOLDING STRIPS
Alvin J. Furstenburg, Chicago, and Edmund J. Kujawa, Wilmette, Ill., assignors to Felt Products Mfg. Co., a corporation of Delaware
Filed Apr. 13, 1966, Ser. No. 542,343
9 Claims. (Cl. 18—42)

This invention relates to a compact mold for molding elongated strips of material, such as gasketing material, of uniform quality throughout their lengths, and to methods of making and using said mold.

Although the mold of the present invention may be used for molding various types of strip material, the invention will be described with particular reference to strips of gasketing material in which uniformly high quality throughout the length of the strip is an important requirement.

Gasketing material, which may be of rubber or other suitable moldable composition, has heretofore been made in desired lengths by extrusion processes, by core molding processes and the like. Extrusion processes are not satisfactory for making gasketing material for many applications because they do not insure the uniformity of quality that is sometimes required throughout the length of the strip in order to obtain suitable and effective seals. Elongated strips of gasketing material produced by core molding apparatus may be of uniformly high quality throughout their lengths. However, the making of molding apparatus of the core molding type is difficult, elaborate and expensive. The utilization of core molding apparatus results in extremely high labor costs.

In accordance with the present invention, a mold member is provided with a helical molding groove. The helical molding groove and the convolutions thereof lie in a generally flat plane. That contrasts to core molds in which the molding groove lies generally in a cylindrical plane. Such a mold has many advantages, among which are its ease of manufacture, its ease of utilization in molding, resulting in low labor costs and the uniformity of the product which may be made in such a mold.

This invention is concerned with a mold as will be apparent from the following description and drawings of which:

FIG. 7 is an enlarged cross-sectional view taken along the line 7—7 of FIG. 4;

FIG. 8 is an enlarged fragmentary perspective view viewed generally from the line 7—7 of FIG. 4;

FIG. 9 is a plan view of a mold blank of a modification of this invention;

FIG. 10 is a plan view of the mold blank of FIG. 9 after grooves have been machined therein;

FIG. 11 is an enlarged sectional view taken along the line 11—11 of FIG. 12 with an upper mold member overlying the grooves in the mold blank;

FIG. 16 is a plan view of a mold blank of a further modification of this invention;

FIG. 17 is a plan view of a further mold blank similar to FIG. 16;

FIG. 18 is a plan view of the mold blank of FIG. 16 with grooves machined therein;

FIG. 19 is a plan view of the mold blank of FIG. 17 with grooves machined therein;

FIG. 20 is a plan view of a helical mold member made from portions of the mold blanks of FIGS. 18 and 19; and FIG. 21 is a plan view of a helical mold member made from portions of the mold blanks of FIGS. 18 and 19.

Figure 1:
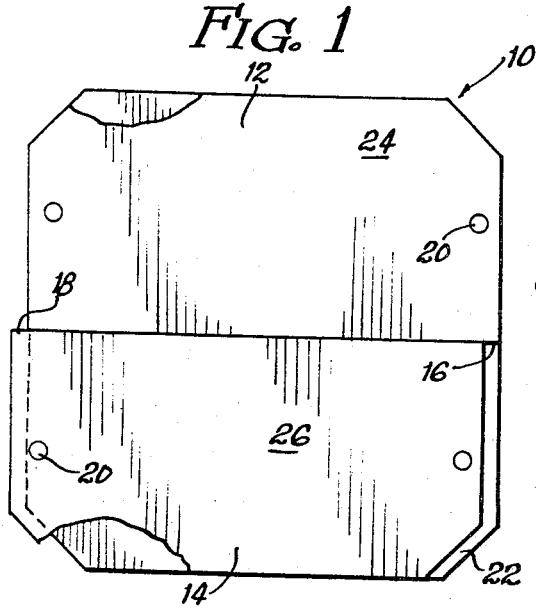
FIG. 1 is a plan view of a mold blank of a preferred embodiment of this invention.

As stated, this invention contemplates the provision of a helically grooved mold having a groove comprising a plurality of convolutions in which the plurality of convolutions lie in a generally flat plane. In the embodiments illustrated one of the mold members is made of two or more sections each defining a plurality of groove segments, said sections and groove segments being aligned to define one or more continuous helical grooves each having a plurality of convolutions.

Referring first to FIGS. 1 to 8 of the drawings, which comprise a presently preferred embodiment of this invention, a mold blank 10 is provided. Mold blank 10 comprises two abutting mold segments 12 and 14, respectively, abutting adjacent edges 16 and 18 defining a line of division therebetween. Mold segments 12 and 14 are held in abutting relationship by a plurality of removable pins 20 which reach downwardly into retaining plate 22.

A plurality of grooves are then machined into the generally flat coplanar surfaces 24 and 26 of abutting mold segments 12 and 14. The grooves may be machined into those surfaces initially, or they may be machined after an annular recess, such as recess 28 best seen in FIG. 3, has been machined.

Figure 2:
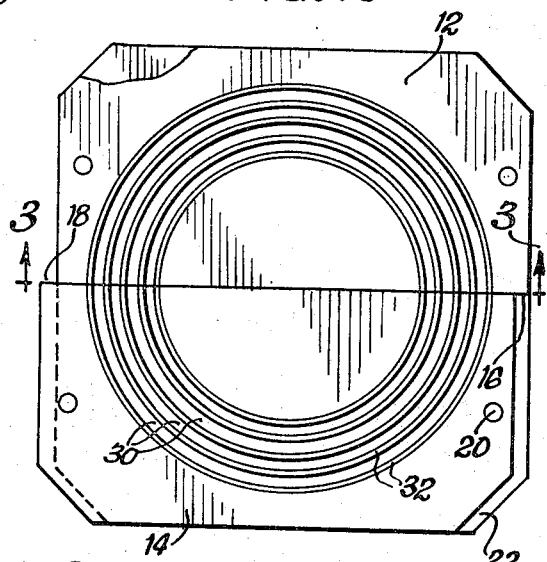
FIG. 2 is a plan view of the mold blank of FIG. 1 with grooves machined therein.
Figure 3:
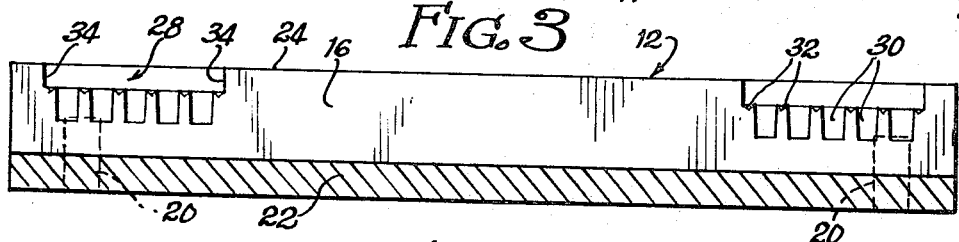
FIG. 3 is a sectional view taken along the line 3—3 of FIG. 2.
Figure 5:
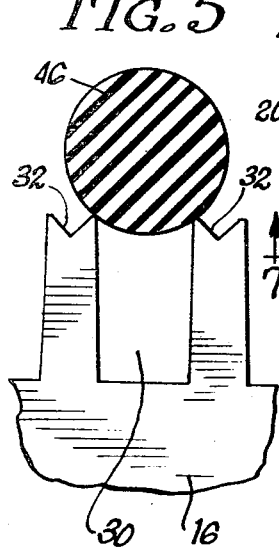
FIG. 5 is an enlarged fragmentary view of a portion of FIG. 3.

As seen in FIGS. 2 and 3, two sets of grooves are machined into the respective surfaces 24 and 26 of the mold segments. The grooves of greater cross-sectional area are the molding grooves and are designated as 30. Adjacent each side of each molding groove there is machined an overflow groove 32 which, as best seen in FIGS. 3 and 5, is of substantially lesser cross-sectional area than molding grooves 30.

As seen in FIG. 2, the molding and the overflow grooves are concentric about a center lying along a line of division provided by abutting edges 16 and 18. The overflow grooves are substantially uniform in cross-sectional area throughout and the molding grooves are of substantially uniform cross-sectional area throughout. The molding grooves are equally spaced from each other adjacent abutting edges 16, 18, and the overflow grooves are equally spaced from each other adjacent abutting edges 16, 18. As seen in FIG. 2, each overflow groove 32 and each molding groove 30 is continuous and endless.

After the molding and overflow grooves have been machined in the surfaces of the abutting mold segments, pins 20 in abutting mold segment 14 are removed. Mold segment 14 is then separated from mold segment 12 along the line of division defined by the abutting edges. At that time each mold segment defines groove segments, each groove segment having two ends opening at the line of division or abutting edge. The ends of the groove segments of one mold segment are then brought into alignment with the ends of formerly adjacent groove segments of the other mold segment to provide intercommunication therebetween. That is done for both molding groove and overflow groove segments.

Figure 4:
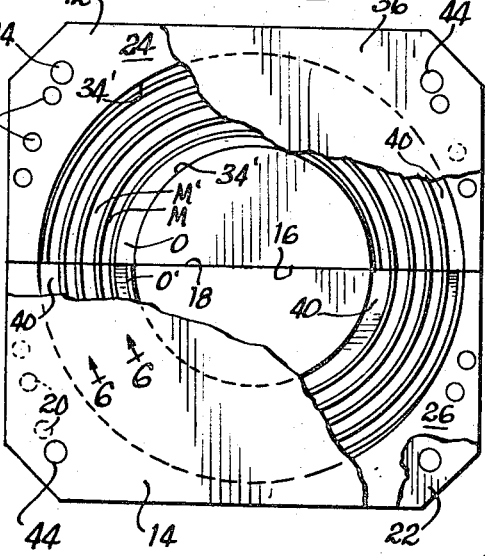
FIG. 4 is a plan view of a completed mold incorporating the mold blank of FIGS. 1 and 2, with portions of the upper mold member broken away to show the helical configuration of the grooves.

In that manner, as best seen in FIG. 4, a helical groove configuration is provided. As seen in FIG. 4, two parallel helical molding grooves M and M' are provided, each having a plurality of convolutions. Each is also provided with an adjacent parallel overflow groove O and O'. Once the ends of the grooves have been properly aligned and the respective abutting edges 16, 18 of the abutting mold segments are in firm abutting contact with each other, additional pins 20 are provided insuitable openings in the mold segments and retaining plate to secure the abutting mold segments to the retaining plate 22 to provide, if desired, a permanent connection therebetween. However, the pins may be removable.

As seen in FIG. 3, recess 28 is circumscribed by vertical walls 34. When the abutting mold segments of FIG. 2 are juxtaposed to define the continuous helical grooves just described, walls 34 of the two abutting mold segment recess sections will no longer be in alignment adjacent edges 16 and 18. Since, in this embodiment, the molding and overflow grooves have been shown to be positioned within recess 28, to provide conveniently an upper mold member 36 (see FIG. 7) it is desirable to re-machine the juxtaposed segments of recess 28 to define a continuous circular annular recess 28' to receive a complementary mating molding section 37. As best seen in FIG. 7, recess 28' has been re-machined to provide generally vertical recess walls 34' and generally helical land areas 40. Recess 28', as seen in FIG. 7, receives complementary molding section 37 which, like recess 28', is a continuous annulus. Molding section 377 defines a generally flat or planar molding face 42 which, with the molding grooves defines closed helical molding apertures.

Upper mold member 36 may be reciprocably supported as by rods 44 to elevate upper mold member 36 and to bring upper mold member 36 into mating relationship with the mold member constructed as described. Compressive forces may be applied as desired and necessary through means such as a pressure plate, a flat steam platen or by any other well known means. Additionally, means (not shown) for heating the mold, as a flat steam platen, may be provided in any conventional manner where necessary or desirable.

Figure 6:
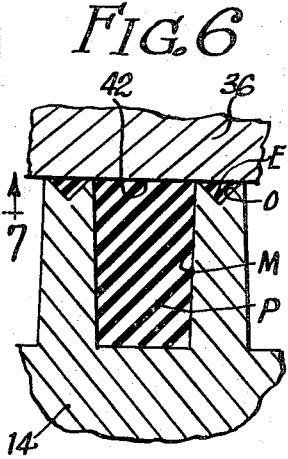
FIG. 6 is a fragmentary view similar to FIG. 5 taken along the line 6—6 of FIG. 4.

As best seen in FIGS. 5 and 8, the mold of this invention may be used by positioning a moldable material over and along the continuous helical molding grooves M and M'. The moldable material may comprise one or more elongated strips such as ropes 46 of a composition such as an unvulcanized rubber composition which is simply laid over and along the molding grooves manually. The volume of the rope is slightly greater than the volume of the molding grooves M and M' so that when compressive forces are exerted against the rope it will fill not only the molding groove, but the excess will overflow into the overflow grooves O and O'. This assures the proper and desired quality of the strip to be molded in the mold. The representative distribution of the material of the rope during curing and after molding is illustrated by FIG. 6 in which the product P is shown in a molding groove and the excess material is shown as E in an overflow groove. Thereafter the mold is opened and product P and excess E are removed and separated.

As will be appreciated, the configuration of product P may vary as desired simply by machining molding grooves of differing cross-sectional areas and configuration in molding segments 12 and 14. Additionally, the molding grooves and/or overflow grooves may be provided in part in the lower mold member and in part in the upper mold member such as in the manner described for providing the grooves in the lower mold member hereinbefore, and, as illustrated by FIG. 11, the molding and overflow grooves may be machined in the planar or flat surfaces of abutting mold segments rather than in a recess of abutting mold segments.

A further embodiment of this invention is illustrated by FIGS. 9 to 12 inclusive. There lower mold member 100 comprises mold segments 102, 104 and 106. In FIG. 9 mold segments 102 and 104 are shown as being adjacent each other and abutting each other along an angled division line 108, which division line is defined by abutting edges of mold segments 102 and 104. Segments 102 and 104 may be secured to a retaining plate (not shown) in a manner similar to that described in connection with the embodiment of FIG. 1 prior to grooving.

Figure 12:
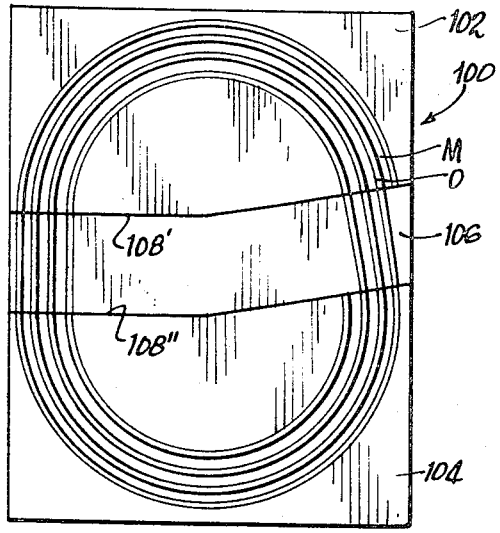
FIG. 12 is a plan view of a helical mold member made from the mold blank of FIG. 10.

While so retained, mold segments 102 and 104 are provided with continuous endless circular concentric molding and overflow grooves 110 and 112, respectively, their centers lying on line 108 at the intersection of its angled legs. After the grooves have been suitably machined in segments 102 and 104, those mold segments are separated along line of division 108 and realigned, and mold segment 106 which may be characterized as an insert or bridging piece is positioned therebetween. Segment 106 is provided with machined molding and overflow grooves having the same dimensions and spacing (at their ends) as those of the segments 102 and 104. As seen in FIG. 12, the groove segments at the left-hand side of segment 106 interconnect the former abutting ends of the respective groove segments of mold segments 102 and 104 along one line of contact 108' and 108''. However, at the righthand side of FIG. 12, it will be seen that the groove segments of mold segment 106 interconnect the ends of formerly adjacent groove segments, thereby defining a single continuous helical molding groove M and an adjacent single helical overflow groove O.

The angle of division line 108 and the relative size and proportions of mold segment 106 may be varied. In the embodiment illustrated the intersection of the groove segments of mold segment 106 and those of segments 102 and 104 is closely tangential, as seen in FIG. 12, a sometimes desirable feature.

As seen in FIG. 11, a covering mold member 114 covers the grooved surface of lower mold member 100. It will be noted that grooves 110 and 112 have been machined directly into the planar or flat surface of mold segment 102 and a molding groove configuration appears in the lower flat or planar surface of mold member 114. That molding groove configuration 116 may be provided in mold member 114 in the same manner described for making mold member 100. The overflow groove of mold member 100 may serve for both molding grooves, or overflow grooves may also be provided in mold member 114. When mold members 100 and 114 are juxtaposed they define a closed helical molding aperture having a plurality of convolutions, part of the molding aperture lying within each of the mold members.

Figure 13:
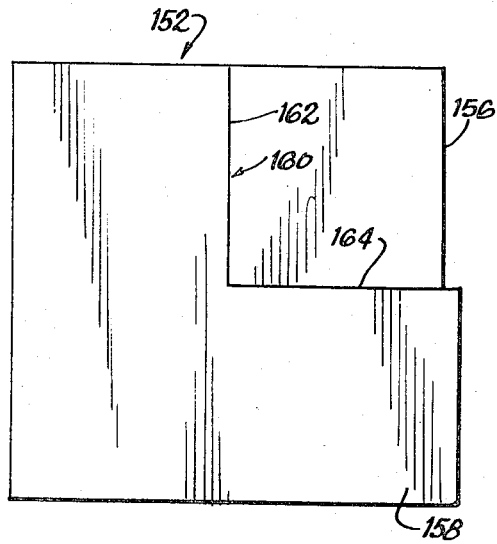
FIG. 13 is a plan view of a mold blank of a further modification of this invention.
Figure 14:
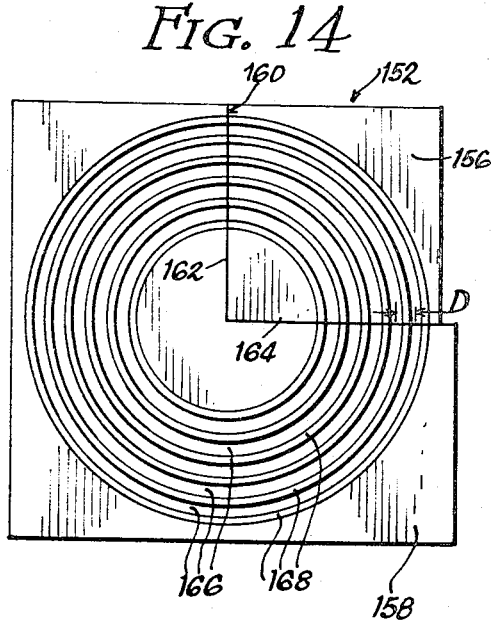
FIG. 14 is a plan view of the mold blank of FIG. 13 with grooves machined therein.
Figure 15:
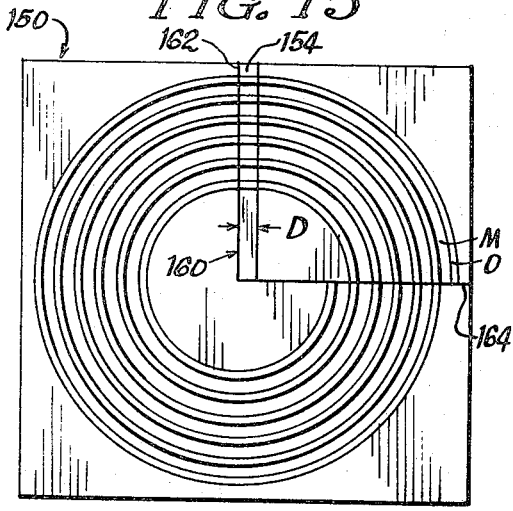
FIG. 15 is a plan view of a helical mold member made from the mold blank of FIG. 14.

Referring now to the embodiments of FIGS. 13 to 15, a lower mold member 150 comprises flat surfaces plate 152 and bridging segment 154. Plate 152 is divided into two mold segments 156 and 158 along an angled division line 160 having two legs 162 and 164 which intersect at right angles.

A plurality of concentric, endless circular molding and overflow grooves 166 and 168, respectively, are then machined in plate 152, the intersection of legs 162 and 164 serving as the radius of the grooves. They are equally spaced from each other along the line of division 160.

Thereafter, section 156 is moved laterally along leg 164 an amount equal to the distance D between the ends of adjacent grooves at the line of division 160. In so doing, as best seen in FIG. 15, the ends of the overflow and molding grooves of mold segment 156 are moved transversely into confronting relationship with the next adjacent molding and overflow grooves of mold segment 158. In that manner the groove ends are aligned.

Bridging plate or mold segment 154 which has molding and overflow grooves machined therein is then positioned in the gap between the aligned faces of segments 156 and 158 where they have been separated along leg 162 of angled line 160. The grooves of mold segment 154 interconnect the aligned spaced ends of the segments of grooves 166 and 168, respectively, thus transforming the plurality of circular molding grooves and circular overflow grooves into single continuous helical grooves M and O.

A covering mold member for the embodiment of FIGS. 13 to 15 may be made as previously described and the mold used as hereinbefore described.

It is to be noted that the mold member so far described has been made from mold blanks comprising a plurality of separable members, i.e. separate mold segments positioned in abutting relationship and then grooved. This provides very accurately machined abutting edges in the assembled helical molds, something which is not as easy to attain if the blank is first severed after the grooves have been machined. However, it is possible to start with a one piece mold blank, machine the grooves and then divide the blank into several segments as by sawing or the like. In either case the segments are separated along a line of division to make a mold of embodiments of this invention illustrated herein.

The embodiment of FIGS. 16 to 21 is similar to that of FIGS. 1 to 8, except that the lower mold member is provided with a single helical molding groove and a single helical overflow groove instead of the pairs of helical molding and overflow grooves described in conjunction with FIGS. 1 to 8.

In the embodiment of FIGS. 16 to 21, mold blanks 200 and 202 are provided. Each of these comprises two abutting mold segments, 204 and 206, and 208 and 210, respectively. Alternate circular molding and overflow grooves 212 and 214 are machined in the flat coplanar surfaces of segments 204 and 206, while these segments are held with their edges in abutting relationship in a manner similar to that described in connection with the embodiments of FIGS. 1 to 8. Grooves 212 and 214 are concentric about a center 216 which lies on the division line along which the mold segments 204 and 206 abut. Similarly, molding grooves 218 and overflow grooves 220 are machined in the flat coplanar surfaces of segments 208 and 210 of molding member 202, said grooves being concentric about a center 222 which lies on the division line along which mold segments 208 and 210 abut.

As with previous embodiments, the molding grooves are equidistantly spaced from each other at the division lines and the overflow grooves are equidistantly spaced from each other at the division lines. In this embodiment, that spacing between the molding grooves (spacing D) and the overflow grooves (spacing X) of mold blanks 200 and 202 is the same. However, the distances of ends of the molding and overflow grooves from each other in mold members 200 and 202 is not the same, that difference being equal to the distance D or X (both of which are the same) between the molding grooves or the overflow grooves at the division line. The distance between the groove ends referred to is the distance between the centers of the molding grooves or between the centers of the overflow grooves, both being the same since both are equally spaced from each other. Thus, as seen in FIGS. 18 and 19 $A=B+X$ or $B+D$, A being the distance between the ends of molding groove segments of mold blank 200, B being the distance between the ends of molding groove segments of mold blank 202 and X and D being as described. This is graphically illustrated in FIGS. 20 and 21.

When one of mold segments 204 and 206 is aligned with one of mold segments 208 and 210, a single helical molding groove 224 and a single helical overflow groove 226 is provided as seen in FIGS. 20 and 21 by the aligned and interconnected ends of the respective groove segments. The resulting mold members may be used with a flat surface covering mold member as previously described or, since they are complementary, they may be used together to define a helical molding tunnel-like groove in which said groove lies partially within the surface of each mold member.

The molding grooves and overflow grooves have been illustrated as being alternate and adjacent in the embodiments described. However, it is possible, where desired, to provide land areas between them which land areas will not interfere with the operation or manufacture of the molds as long as the spacing of the grooves, both molding and overflow, is proportioned so that when mold segments are aligned appropriate ends of the groove segments of the mold segments are aligned or alignable to provide one or more helical grooves having a plurality of convolutions.

The foregoing embodiments of this invention are intended to be illustrative only and not limiting on this invention.

We claim:

1. A mold comprising a pair of complementary mold members, each having a generally flat surface portion, said flat surface portions being in opposed relationship, at least one of said molding members defining a helical molding groove having a plurality of convolutions in said flat surface portion and means for urging said molding members together to define a closed helical molding tunnel groove between said complementary mold members.

2. The mold of claim 1 in which said molding member defining a helical molding groove defines a complementary overflow groove of substantially lesser cross-sectional area.

3. A mold comprising a pair of complementary mold members, each having a generally flat surface portion, said flat surface portions being in opposed relationship, at least one of said mold members comprising at least two separable abutting segments, said one of said mold members defining in said generally flat surface portion at least one continuous helical molding groove lying partially in each of said separable abutting mold segments.

4. The mold of claim 3 in which said generally flat surface portion of said one mold member defines a continuous helical overflow groove adjacent said molding groove.

5. The mold of claim 3 in which said helical molding groove comprises circular groove segments lying within each of said separable segments.

6. The mold of claim 5 in which said circular groove segments define continuous circular grooves in a first position and a continuous helical groove in said mold.

7. The mold of claim 4 in which said one mold member comprises at least three segments.

8. The mold of claim 3 in which said one mold member comprises two separable abutting segments and defines a single helical molding groove.

9. The mold of claim 8 in which said abutting segments each defines a plurality of molding groove segments, each molding groove segment opening at two ends at the abutting edge of said mold segment and being aligned with ends of molding groove segments in the other abutting mold segment to define said single helical molding groove.

References Cited

UNITED STATES PATENTS

| | | | |
|---|---|---|---|
| 1,737,874 | 12/1929 | Busch. | |
| 2,731,669 | 1/1956 | Talalay | 18 |
| 2,893,058 | 7/1959 | Wurtz et al. | 18—35 X |
| 2,913,767 | 11/1959 | Simon | 18 |
| 2,976,575 | 3/1961 | Daubenberger | 18 |

J. HOWARD FLINT, JR., *Primary Examiner.*